United States Patent
Roosen et al.

(10) Patent No.: US 6,970,260 B1
(45) Date of Patent: Nov. 29, 2005

(54) APPARATUS AND METHOD FOR AUTOMATIC HANDLING OF SCAN ORDERS

(75) Inventors: Monica M. W. M. Roosen, Venlo (NL); Robertus C. W. T. M. van den Tillaart, Gemert (NL)

(73) Assignee: Océ-Technologies B.V., Venlo (NL)

( * ) Notice: Subject to any disclaimer, the term of this patent is extended or adjusted under 35 U.S.C. 154(b) by 0 days.

(21) Appl. No.: 09/502,010

(22) Filed: Feb. 11, 2000

(30) Foreign Application Priority Data

Feb. 12, 1999 (NL) .................................. 1011285

(51) Int. Cl.[7] .......................................... G06F 15/00
(52) U.S. Cl. ................... 358/1.15; 358/408; 358/434; 358/435; 710/1; 709/203
(58) Field of Search ............................. 358/1.15, 1.13, 358/1.14, 405, 406, 407, 408, 434, 435, 442, 358/474; 399/8, 9, 31, 32; 709/240, 242, 709/249, 201, 203; 710/1, 8

(56) References Cited

U.S. PATENT DOCUMENTS

| | | | | |
|---|---|---|---|---|
| 5,768,483 A | * | 6/1998 | Maniwa et al. | 358/1.15 |
| 5,862,404 A | * | 1/1999 | Onaga | 710/8 |
| 5,911,044 A | * | 6/1999 | Lo et al. | 709/203 |
| 5,933,580 A | * | 8/1999 | Uda et al. | 358/1.13 |
| 5,935,217 A | * | 8/1999 | Sakai et al. | 709/249 |
| 5,946,457 A | * | 8/1999 | Nakai et al. | 358/1.13 |
| 6,115,739 A | * | 9/2000 | Ogawa et al. | 709/215 |
| 6,256,107 B1 | * | 7/2001 | Toda | 358/1.15 |
| 6,412,022 B1 | * | 6/2002 | Kumpf et al. | 710/1 |

FOREIGN PATENT DOCUMENTS

| | | |
|---|---|---|
| EP | 0757311 | 2/1997 |
| EP | 0884672 | 12/1998 |

* cited by examiner

*Primary Examiner*—Joseph R. Pokrzywa
(74) *Attorney, Agent, or Firm*—Birch, Stewart, Kolasch & Birch, LLP

(57) ABSTRACT

A system and method for generating digitized documents for a digital environment, having at least one scanner, a local operator control unit, and a management unit connected to the scanner or scanners. The management unit is provided with an input unit for receiving, from the digital environment, a request for a digitized document; a warning device for communicating a request for a digitized document to at least one scanner; a receiving unit for receiving from a scanner an acceptance of a request selected via the operator control unit; and an allocation unit whereby, in response to the acceptance, a scan order for generation of the digitized document requested in the said selected request is allocated to the scanner which sent the acceptance. This enables incoming scan orders to be held until a scanner is ready to execute them, without in any way interfering with current scanning processes.

39 Claims, 5 Drawing Sheets

APPARATUS AND METHOD FOR AUTOMATIC HANDLING OF SCAN ORDERS

BACKGROUND OF THE INVENTION

1. Field of the Invention

The invention relates to a system for generating digitized documents for a digital environment, including at least one scanner, provided with a local operator control unit. The invention also relates to a method for use in such system.

2. Description of Related Art

A system of this kind is known from EP-A 0 757 311. In this conventional system, a scanner is connected via a network to a digital environment. The term "digital environment" in this context denotes a set of digital data processing devices, such as computers and workstations, interconnected by a local network.

To initiate a scanning process in this conventional system, a memory location in the digital environment is selected on an operator control panel of the local operator control unit of a scanner, i.e. an operator control unit present in the machine itself, the memory location being intended as a destination for a data file to be generated during the scanning, and a name is specified for the file. The memory location is usually a directory in the memory of a computer connected to the scanner via the network.

After an operator has selected the destination in the conventional system, he can start the actual scanning process, whereafter the generated image data are automatically transmitted by the scanner to the destination where they are stored under the given file name in the selected directory.

One disadvantage of this conventional procedure is that an order for the scanning of a specific document must first be communicated by an applicant to the scanner operator, who is frequently situated at a completely different place, the applicant also having to indicate a destination and a file name. The operator of the scanner must also locally input the destination and name.

An improvement can be obtained by digitally transmitting to the scanner via the network a scan order which already contains the destination and name. These data can then be automatically taken over by the scanner so that the operator no longer has to take any further action. This solution has been embodied in an Océ-Technologies B.V. product known as the Océe 9800. In this product, a scan order is compiled by an external application, the scan order containing a specification of the required digital format of the data file for generation, a name for the same and the destination to which the file must be sent.

A scan order of this kind, however, blocks the scanner until the order has been executed. This can lead to delays, for example if the document for scanning is not yet directly available, because no other scan orders can be executed in the meantime.

The conventional procedure obstructs efficient management, and fails to provide a system in which that scan orders can be given from a workstation in the digital environment but do not have to be executed until everything is ready so to do.

SUMMARY OF THE INVENTION

To this end, according to the inventive system includes a management unit connected to the scanner or scanners and is provided with:

inputting means for receiving, from the digital environment, a request for a digitized document warning means for communicating a request for a digitized document to at least one scanner receiving means for receiving from a scanner an acceptance of a request selected by means of the operator control unit allocation means whereby, in response to the acceptance, a scan order for generation of the digitized document requested in the said request is allocated to the scanner which sent the acceptance.

As a result, a scan order can be transmitted via the network to a scanner, but is held there without blocking the scanner. An operator of a scanner observing that a scan order has arrived can then call the scan order up from the management unit and execute it at a time that suits him.

More particularly, according to one embodiment of the invention, before accepting a specific scan order, the operator can first request information concerning the nature of the scan order.

In another embodiment of the invention, the central management unit is also provided with means for checking whether the requested digitized document is already available in a required digital form in a connected database. If that is the case, the management unit will simply send the data file concerned from the database to the applicant, without issuing a scan order. Of course the data file already available must have a format equal to the format specified by the applicant. If that is not the case, it may possibly be converted to the required format by the management unit, but if that leads to a loss of quality the management unit will make a scan order pending.

In another embodiment of the present invention, the allocation means when allocating the said scan order prevent other scanners from accepting the request concerned for a digitized document. As a result, an order cannot be executed simultaneously by more than one scanner/operator due to a misunderstanding, thus obviating any waste of capacity and confusion.

A request for a digitized document may contain a number of requirements which the applicant specifies of the scanning process or the result thereof. A first requirement is the form in which the data file for generation must be supplied, e.g. the digital format, and also the scanning resolution and color or black/white. The management unit can be so constructed according to the invention that it passes the scan order only to those scanners capable of executing the order. Also, when the management unit in some way knows that a scan order consists of parts with different properties, e.g. a black/white document with some colored sheets, the management unit can automatically divide it up into different sub-orders and make these pending at different suitable scanners.

The applicant can also specify a precondition for the scanning process, e.g., that the result must be available before a specific time or date. According to the invention the management unit can be so constructed that it can meet this outline specification, for example by making the scan order concerned pending with priority. Priority treatment can be imposed by the management unit by making solely the scan order concerned acceptable.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
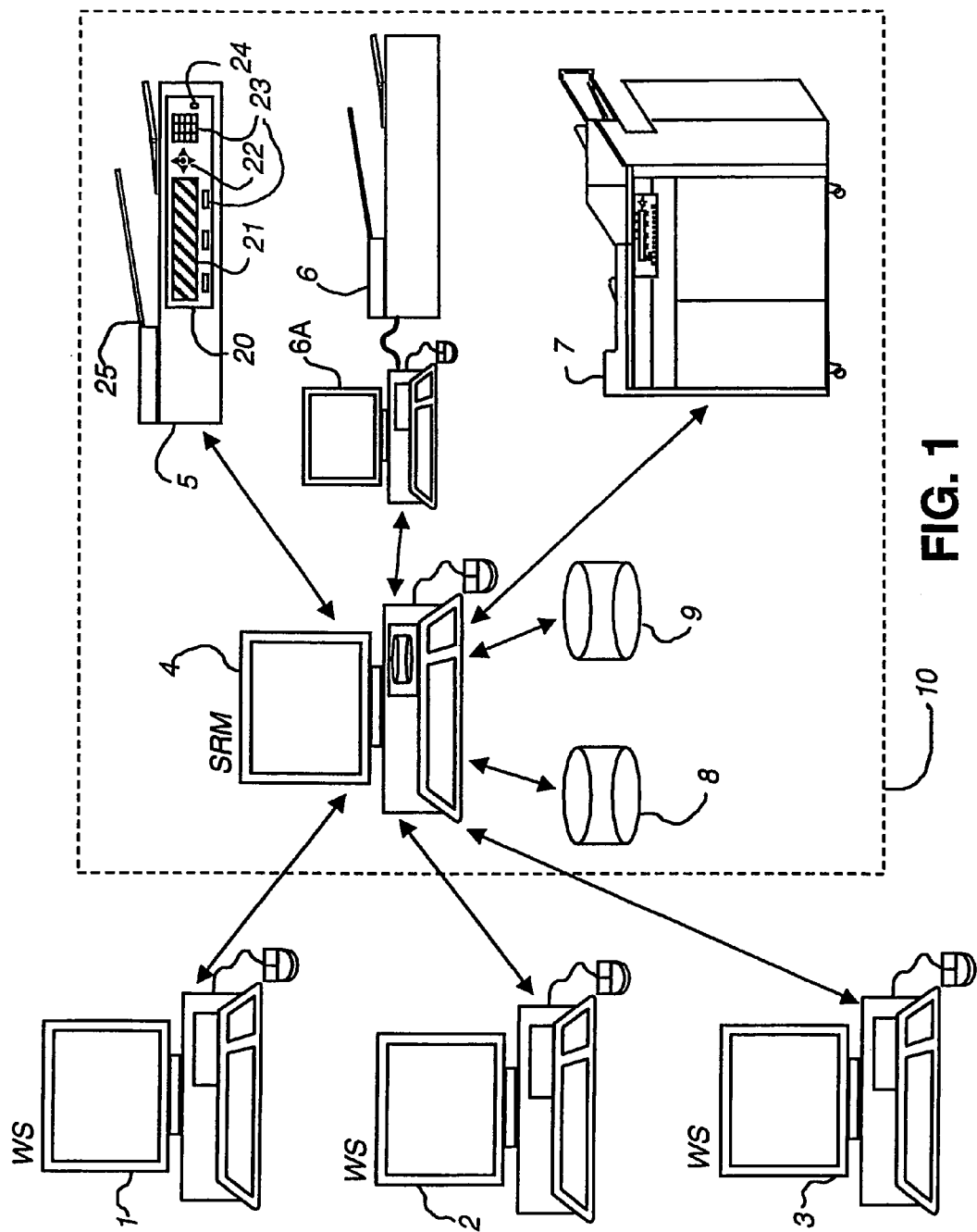
FIG. 1 is a diagram showing a system according to the invention.

FIG. 1 is a diagram showing a system according to the invention. The system includes a number of workstations 1, 2 and 3 for users, a central management unit 4 for coordinating scan orders, hereinafter referred to as ScanRequest-Manager (SRM), and a number of scanners 5, 6 and 7.

The scanners are provided with their own operator control unit (not shown separately), equipped with operator control means such as keys 22, 23, 24 and a display 21, possibly in the form of an external operator control unit 6A, such as a PC. It is also possible to include in the system the scanner of a suitably equipped multifunctional digital copying machine. All these elements are interconnected by means of a local network (not shown), to which they are connected.

The SRM 4 is a suitably programmed computer, e.g. a PC, and is connected to data storage 8 and data storage 9, which can be accommodated in a hard disk unit in the SRM 4, or alternatively in a separate housing. Data storage 8 is intended for the storage of data relating to incoming scan orders, data storage 9 is a large database in which a large number of digitized documents are stored. The latter can also be a unit located at a distance or even a set of local and external databases which are possibly also accessible to other users.

The above-mentioned operator control means of the scanners used in this system include, for example, an operator control panel 20 having thereon a display 21, a start key 24 and operator control keys 22, 23. The scanners also have an inputting unit 25 for automatically separating and processing the sheets of a document.

The scanners 5, 6, 7 and the SRM 4 belong to a service unit for the workstations and their users, and are disposed near one another, e.g. in a central reproduction department (diagrammatically indicated by the broken line 10) of an organization. The invention can also be used in a small system comprising an SRM and, for example, one scanner disposed, for example, in a department secretariat.

From their workstations (1, 2, 3) users can make a request for a specific digitized document, whereafter the request is handled automatically by the SRM 4. If the requested document is not yet available in the database 9 in a usable digital form, then the SRM converts the request to an order to scan the required document and to send the scanfile (the digital image data generated during the scanning) to a destination indicated by the applicant, usually his workstation. If required, a copy of the scanfile can default or optionally be stored in the database 9.

Figure 2A:
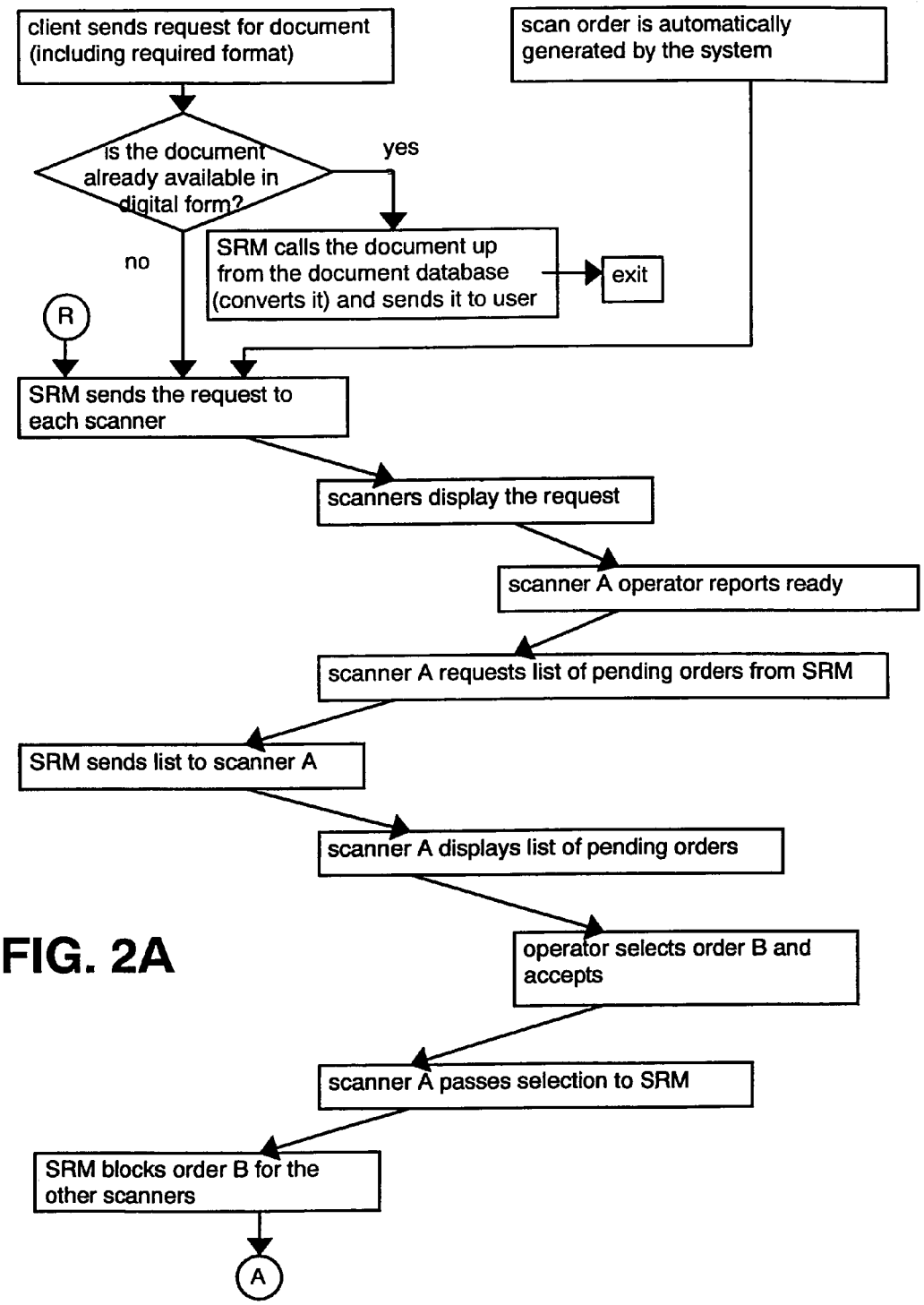
FIGS. 2A and 2B are flow diagrams of the procedure when filing and implementing a request for a digitized document.
Figures 2, 2A, 2B:
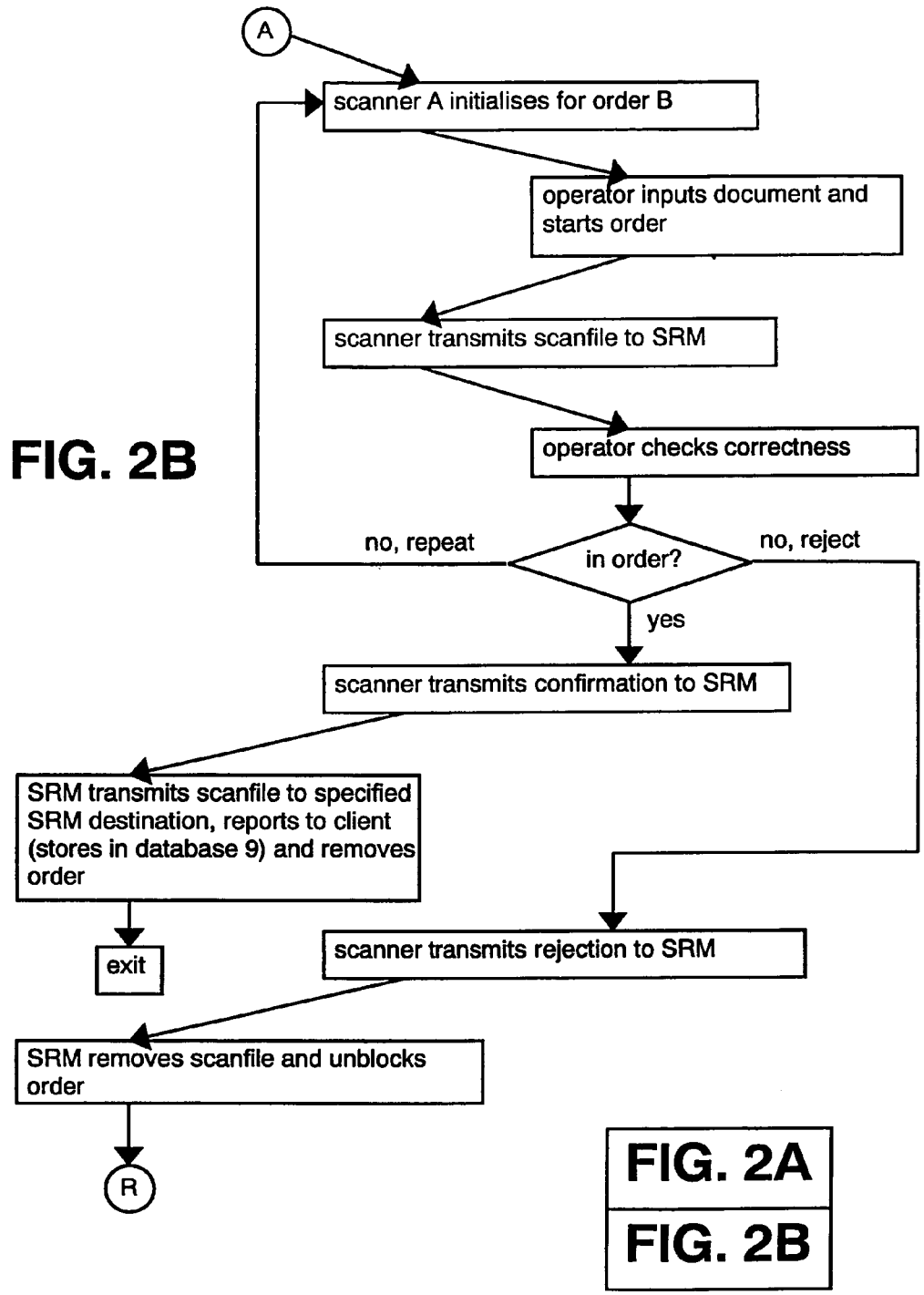

A scan order is not sent direct to a specific scanner by the SRM 4; a message is instead sent to all the scanners to the effect that a scan order is waiting. This message is displayed on the display 21 of the scanners. An operator who sees this message can then actuate a specific scanner, call up the list of waiting orders, and choose and execute one of them. This will be described in detail with reference to FIGS. 2A and 2B.

For the purpose of requesting a digitized document, the workstations 1, 2, 3 are provided with an application by means of which the user can compile a request for such a document by inputting a number of parameters which identify the document and the required format of the data file that represents the document and determine the destination address. The same application can be used then to send the request to the SRM 4.

The following parameters, for example, may be input:

Scan ticket information
Scan ticket Version (number)

| Request owner | |
|---|---|
| Person making the request | (Name) |
| Account ID | (For payment or administration) |
| Location | — |
| Telephone number | — |
| E-mail address | — |
| Document description | |
| Document | (Unique identification, e.g. number or place where kept) |
| Pages requested | (e.g.: all, 3–10, summary) |
| Type | (e.g.: simplex, duplex, color) |
| Information relating to document storage | (e.g.: none, 1 year; storage place) |
| Destination description | |
| Type of order | (e.g.: new, add to or over-write existing data file) |
| File name | (file name under which the scanfile must be supplied) |
| Information relating to storage of the scanfile | (e.g.: in database or not; length of time to be kept) |
| Data format | (e.g.: TIF, BMP) |
| Version number | (optional) |
| Resolution | (e.g.: 400 dpi, 600 dpi) |
| Bit depth | (e.g.: color, grey values, black/white) |
| Operator instructions | |
| Acknowledgement | (Yes, no) |
| To: | (Any address to be notified of completion of the order) |
| Message | (Any message from the person making the request to the operator) |
| Priority information | |
| Time limit | (Yes: before (date), no) |

After the request has been compiled, it is sent to the SRM 4 by the application.

The SRM 4 first checks whether the requested document is already present in the database 9. If that is the case, the SRM calls the associated data file up from the storage unit and sends it to the required destination, possibly after first converting it to the required format.

If the required document is not already present in the database 9 in the required digital form, and if it cannot be made from an existing document by conversion, the SRM 4 interprets the request as an order to scan a physical document and send the scanfile to the indicated destination and/or store it in the database 9. The procedure is now as follows.

The SRM 4 sends a request for scanning to each connected scanner. In an alternative embodiment the SRM sends the request only to a limited group of scanners, e.g. those scanners which can carry out a scan process in accordance with the specifications in the request. For this purpose the SRM is provided with a configuration file containing all the connected scanners, with their facilities and limitations. If required, a configuration file of this kind can be prepared automatically and updated by the SRM interrogating the connected scanners as to their facilities and status. A limitation can also be provided in the scanner group, for example by selecting only those scanners which are in the neighborhood of the place where the document for scanning is kept, if this has been established.

Figure 3:
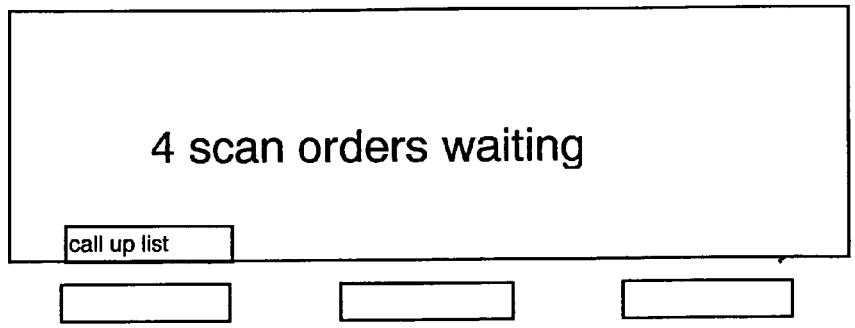
FIGS. 3, 4, 5, 6 and 7 are illustrations of messages on the display of a scanner during the execution of a scan order.

In response to the request for scanning, the scanners display a message indicating the scanning request. This message does not yet give any details regarding the request, and all that is reported is the fact that a request is pending. It may be that there is more than one request pending at any time. In that case, the number can be displayed in the message on the displays at the scanners. An example of a message of this kind is shown in FIG. 3.

An alternative manner of showing that the request for scanning is pending, is a central announcement by means of a signal which can be observed by an operator, e.g. a display or a warning lamp on a central location in the workroom where the scanners are situated or activation of a paging device such as a buzzer worn by the operator.

If an operator is available to execute a scan order, he actuates a key intended for the purpose on the operator control panel 20 of the scanner of his choice (hereinafter referred to as scanner A). In response to this, the operator control unit of scanner A sends a report to the SRM 4, which in response thereto transmits the details of the pending order to the scanner A. If there is more than one order pending, the details of all these orders are transmitted.

Figure 4:
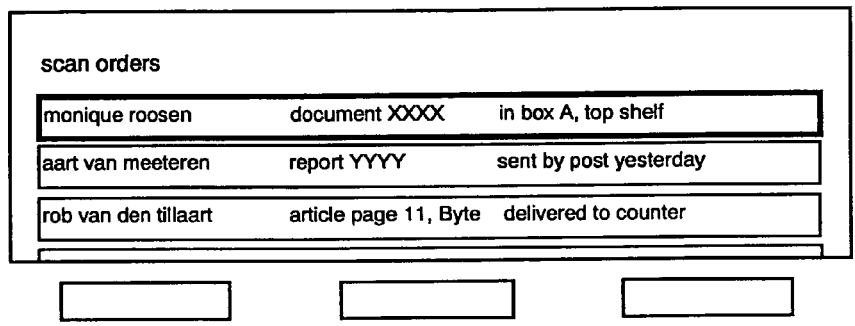

The pending scan orders are then shown by the operator control unit of scanner A with some details in a list on the display, as shown in FIG. 4. This list is, for example, sorted by priority, time of arrival, or alphabetically in the name of the applicant, or by some other criterion.

The top order in the list is preselected, and another order can be selected by means of the keys 22. The selected order is, for example, provided with a black frame as shown in FIG. 4, or can be distinguished in some other way from the other orders. If the list is too long to be fully displayed, the list can be scrolled during selection. The details shown in the list are intended to give the operator adequate details to make a choice.

Figure 5:
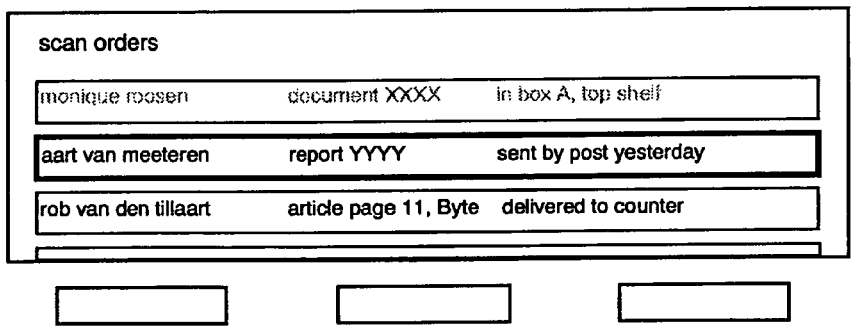

When the operator has made a choice, he actuates the middle key of the keys 22. By this he indicates acceptance of the order. In response, the operator control unit of scanner A sends an acceptance signal to the SRM 4, which reserves the order for scanner A, i.e., no other scanner can accept this order. This is shown on the displays of the other scanners when they display a list of pending orders e.g. by the accepted order being displayed in grey instead of black characters, as shown in FIG. 5.

Figure 6:
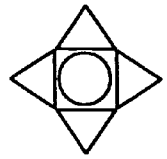

In response to acceptance of an order, the operator control unit of scanner A now shows on the display all the details of the order, including the scanner settings, see FIG. 6. The operator can then program the scanner, or else the scanner will automatically assume the settings. In the latter case, the operator can still change the settings by means of the keys 23. If necessary the operator can finally return the order to the SRM by actuating the key intended for the purpose.

The operator can now place the intended document in the document input of the scanner A and actuate the start key 24, whereafter the scan order takes place automatically and in accordance with the indicated settings. After the scanning each sheet of the document scanner A sends the generated scanfile to the SRM, which provisionally stores it in its internal hard disk memory.

Figure 7:
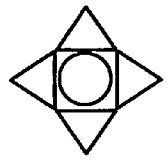

When the complete document has been scanned, the operator control unit of scanner A requests, via a message on the display 21, confirmation from the operator that everything has progressed satisfactorily, see FIG. 7. When the operator has given the required confirmation, scanner A reports to SRM 4 that the order is completed and SRM 4 sends the complete scanfile to the intended destination and, if instructed to do so, stores it in the database 9. The SRM then reports the order as finished to the person giving the order and removes the order from queue.

Simultaneously with the scanning of the document, the SRM can implement a procedure for charging costs to the applicant's account, an amount being debited, for example, per page.

If the operator concludes that there has been some malfunction during scanning, he can reject the entire order by means of keys 23 beneath the display on the operator control panel 20, or indicate that he wishes to retry the entire order immediately. Scanner A notifies this to the SRM, and in the first case the SRM removes the scanfile from its internal hard disk memory, unblocks the order and reports it afresh generally on the displays of all the scanners. In the second case the SRM erases the scanfile from its memory and initializes the scanner afresh for the order.

With the functionality indicated, the SRM 4 can also impose a specific sequence of operations, by making just one pending order acceptable. For example, a "first in-first out" treatment can be selected in order to prevent that orders are left unserviced. Any time limit indicated in the request for a digitized document is taken into account by the SRM when determining a treatment sequence.

The SRM 4 is also provided with a system administrator function by means of which it is possible for an operator to intervene in the procedure via the SRM operator control means, such as a mouse and keyboard, and, for example, a specific order can be treated with priority or blocks can be removed. This function can also be used to change parameters in the request for a digitized document, e.g. if during the handling of a scan order the operator discovers that the indicated name of the document is not (completely) correct.

If there is reason for the same, the SRM can divide a request for a digitized document into several scan orders. One reason may be that the requested document contains numerous pages while at the same time various scanners are unoccupied. It may also happen that inspection of the document for scanning shows that it contains parts which must be processed on different scanners, e.g. colored and black/white document sections, or sheets of different formats. This can be signaled by the operator to the SRM, which then formulates different adapted scan orders. When the scanfiles of these different scan orders are supplied by the scanners, the SRM re-combines them to form a complete scanfile.

In one particular embodiment of the system according to the invention, both color scanners and black/white scanners are connected, the black/white scanners being equipped with a simple color CCD, which can detect that color occurs in the scanned document but cannot supply scanned data of adequate quality. If during the scanning of a document it is found by the scanner that there are color images in the document, the scanner reports this to the SRM. The latter then compiles a new scan order for the color sections of the document and sends it to the color scanners. The scanfiles of these parts of the document, after being delivered, are automatically substituted by the SRM for the parts delivered by the black/white scanner, and the assembled scanfile is sent to the intended destination by the SRM.

Scan orders can also be formulated by an automatic system, e.g. for systematically digitizing an existing paper archive. An administration computer can then automatically generate a list with all the documents for scanning and transmit it to the SRM 4, together with details concerning the required format and the destination, a digital archive. The final handling of the scan orders then proceeds completely as described hereinbefore.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A system for generating digital document data files for a digital environment, comprising:
   a plurality of scanners, each provided with a local operator control unit; and
   a management unit connected to said scanners and to the digital environment,
   wherein the management unit is provided with:
      inputting means for receiving, from the digital environment, a request for a digital document data file,
      warning means for communicating a request for a digital document data file to said plurality of scanners,
      receiving means for receiving from any one of the scanners an autonomous acceptance of the request as selected via said local operator control unit of that scanner, and
      allocation means for, in response to the acceptance, allocating to the scanner that sent the acceptance, a scan order for generation of the digital document data file requested in said request,
   and wherein each one of the plurality of scanners is provided with:
      advertising means for advertising a request for a digital document data file communicated by the management unit on the local operator control unit, and
      selection means for enabling an operator to select the advertised request with aid of the local operator control unit and for automatically sending an acceptance of that request to the management unit.

2. The system according to claim 1, wherein said receiving means includes:
   means for receiving from a first scanner an inquiry concerning information regarding a request,
   means for offering the requested information, and
   means for receiving from the first scanner an acceptance of a request selected with aid of the local operator control unit of the first scanner.

3. The system according to claim 1, wherein said management unit is also provided with means for checking whether the requested digital document data file is already available in a required digital form in a connected database.

4. The system according to claim 1, wherein said allocation means, when allocating the scan order, prevents other scanners from accepting the request concerned for a digital document data file.

5. The system according to claim 1, wherein the request for a digital document data file also contains a specification of required properties and format of the document data file.

6. The system according to claim 5, wherein said management unit, when allocating the scan order, automatically transmits to the accepting first scanner the specification associated with the relevant request.

7. The system according to claim 5, wherein said management unit, simultaneously with indicating that a request has been received for a digital document data file, automatically transmits to applicable scanners the specification associated with the request.

8. The system according to claim 6, wherein said first scanner is provided with means for automatically adjusting the scanning process to generate the required document data file in accordance with the specification in the request after allocation of the scan order.

9. The system according to claim 1, wherein the request for a digital document data file also contains a message to an operator of said scanner.

10. The system according to claim 1, wherein the request for a digital document data file also contains a precondition for processing.

11. The system according to claim 10, wherein the precondition is used by said management unit as a contributory factor in indicating the received requests for a digital document data file.

12. The system according to claim 1, wherein for each of said scanners, the advertising means includes a display.

13. The system according to claim 1, wherein said management unit is provided with means for indicating a request for a digital document data file in the form of a signal perceptible to an operator.

14. The system according to claim 1, wherein said management unit is provided with means for indicating a request for a digital document data file only to those scanners which are capable of executing a scanning process in accordance with the request.

15. The system according to claim 1, wherein said management unit is provided with means for automatically dividing a first request for a digital document data file into a plurality of second requests with different specifications.

16. The system according to claim 15, wherein said management unit is provided with means for assembling digital partial document data files generated in response to the second requests, to form a digital document data file corresponding to the first request.

17. A management unit for managing a system for generating digital document data files for a digital environment, the system having a plurality of scanners, each provided with a local operator control unit, the management unit comprising:
   inputting means for receiving, from the digital environment, a request for a digital document data file;
   warning means for communicating a request for a digital document data file to the plurality of scanners;
   receiving means for receiving from any one of the scanners an autonomous acceptance of the request issued upon its selection by an operator by means of the local operator control unit of that scanner; and allocation means for, in response to the acceptance, allocating to the scanner that sent the acceptance, a scan order for generation of the digital document data file requested in said request.

18. The management unit according to claim 17, wherein said receiving means includes:
   means for receiving from a first scanner an inquiry concerning information regarding a request,
   means for offering the requested information, and
   means for receiving from the first scanner an acceptance of a request selected with aid of the local operator control unit of the first scanner.

19. The management unit according to claim 17, further comprising:
   means for checking whether the requested digital document data file is already available in a required digital form in a connected database.

20. The management unit according to claim 17, wherein said allocation means, when allocating the scan order, prevents other scanners from accepting the request concerned for a digital document data file.

21. The management unit according to claim 17, further comprising:
   means for indicating a request for a digital document data file only to those scanners which are capable of executing a scanning process in accordance with the request.

22. The management unit according to claim 17, further comprising:
   means for automatically dividing a first request for a digital document data file into a plurality of second requests with different specifications.

23. The management unit according to claim 22, further comprising:
   means for assembling digital partial document data files generated in response to the second requests, to form a digital document data file corresponding to the first request.

24. A method of making digital document data files available to a digital environment, comprising:
   receiving, at a central management unit, a request for a digital document data file from the digital environment;
   automatically indicating from the central management unit to a plurality of scanners, that a request for a digital document data file has been received;
   advertising the request on local operator control means of each one of the plurality of scanners;
   selecting, by an operator, the request by with aid of the local operator control means of any one of the scanners and automatically sending an acceptance of that request from that accepting scanner to the central management unit;
   in response to receiving the acceptance, automatically allocating, by the central management unit to the accepting scanner, a scan order for generation of the digital document data file requested in that request; and
   executing the scan order on the accepting scanner.

25. The method according to claim 24, wherein said step of selecting a request comprises:
   inquiring, with aid of the local operator control means of the accepting scanner, for information concerning the request,
   offering the requested information by the central management unit,
   selecting a request with aid of the local operator control means of the accepting scanner, and
   sending an acceptance of the selected request from the accepting scanner to the central management unit.

26. The method according to claim 24, wherein in response to the reception of the request for a digital document data file, a check is first made whether the requested document data file is already available in a required digital form in a connected database.

27. The method according to claim 24, wherein in allocating the scan order, other scanners are prevented from accepting the relevant request for a digital document data file.

28. The method according to claim 24, wherein the request for a digital document data file also contains a specification concerning required properties and format of the document data file.

29. The method according to claim 24, wherein on allocation of the scan order the specification belonging to the associated request is automatically transmitted from the central management unit to the accepting scanner.

30. The method according to claim 24, wherein simultaneously with indicating that the request for a digital document data file has been requested, the specification belonging to the request is automatically transmitted to applicable scanners.

31. The method according to claim 29, wherein after allocation of a scan order, the scanning process for generating the required digital document data file on the accepting scanner is automatically adjusted in accordance with the specification in the request.

32. The method according to claim 24, wherein the request for a digital document data file also contains a message to an operator of the accepting scanner.

33. The method according to claim 24, wherein the request for a digital document data file also contains a precondition for processing.

34. The method according to claim 33, wherein the precondition is used by the central management unit as a contributory factor in indicating the received requests for a digital document data file.

35. The method according to claim 24, wherein the indication that the request for a digital document data file has been received is made in the form of a signal perceptible to an operator.

36. The method according to claim 24, wherein the indication that the request for a digital document data file has been received is made in the form of a message on a display on a scanner.

37. The method according to claim 24, wherein the request for a digital document data file is indicated only at those scanners which are capable of executing a scanning process in accordance with the request.

38. The method according to claim 24, further comprising:
   dividing a first request for a digital document data file into a plurality of second requests with different specifications.

39. The method according to claim 38, wherein the central management unit assembles digital part-document data files generated in response to the second requests, to form a digital document data file corresponding to the first request.

* * * * *